March 26, 1957 — J. MacBLANE, SR — 2,786,686
FEED CHUCKS
Filed July 29, 1955
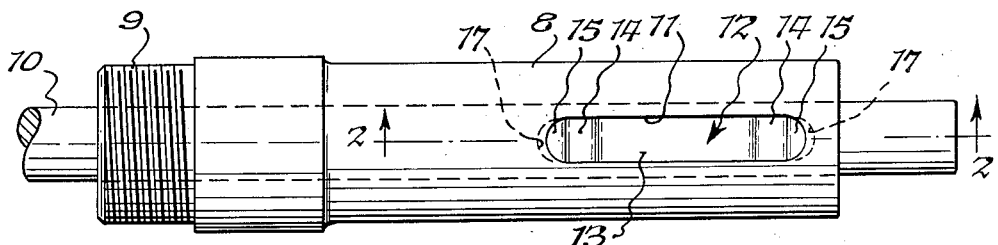
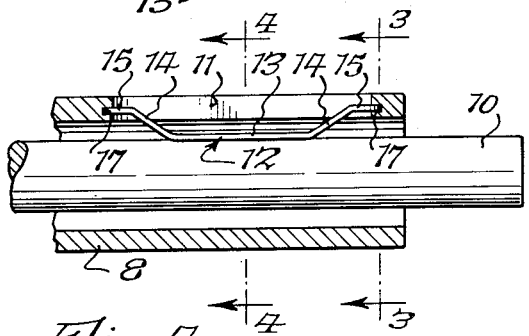
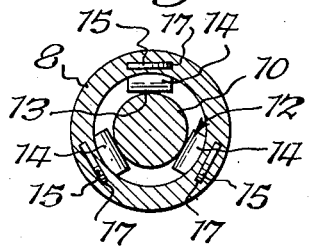 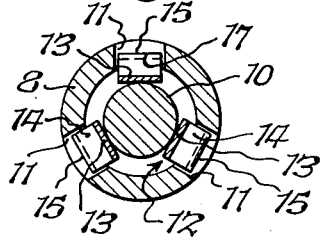
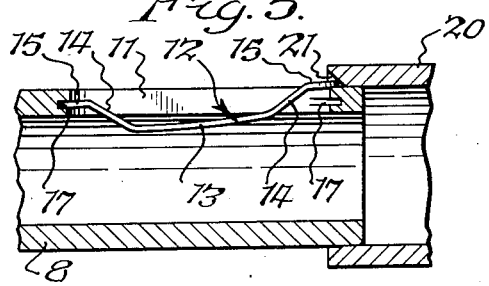 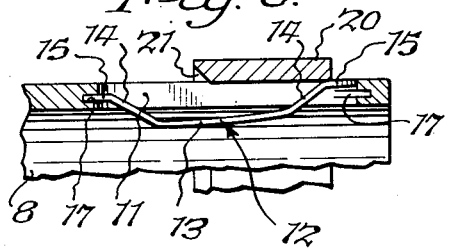
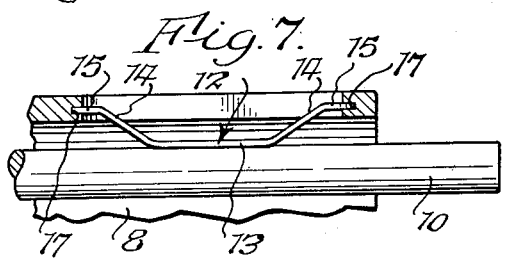
INVENTOR.
James MacBlane, Sr.
BY
Parker Prochnow & Parmer
Attorneys.

United States Patent Office 2,786,686
Patented Mar. 26, 1957

2,786,686

FEED CHUCKS

James MacBlane, Sr., Horseheads, N. Y., assignor to Hardinge Brothers, Inc., Elmira, N. Y.

Application July 29, 1955, Serial No. 525,313

7 Claims. (Cl. 279—23)

This invention relates to improvements in feed chucks or feed fingers of the kind commonly used for advancing the work in automatic screw machines, lathes or the like. More particularly this invention relates to feed chucks of the type commonly referred to as "squirrel cage" feed chucks.

Feed chucks of this type have generally been made by providing a tubular member with longitudinally extending slots terminating in spaced relation to the ends of the member and having the metal between the slots bent inwardly toward the axis of the tubular member into positions to engage the stock to be fed. These inwardly projecting parts when worn by contact with the stock so that they failed to properly grip the stock, were forced inwardly to a greater extent, generally by hammer blows, which involved the difficulty of forcing each of the inwardly extending parts toward the axis to the same extent, as is necessary for the efficient operation of the feed chuck.

One of the objects of this invention is to provide a feed chuck of this type in which the inwardly extending parts are in the form of separate springs removably secured to the body member of the feed chuck so that they can be removed when worn or replaced by other springs formed to cooperate with stock of different diameter or cross sectional shape.

Another object is to provide a feed chuck body member with longitudinally extending slots in which the stock engaging springs can be easily positioned or removed. A further object is to provide springs for a feed chuck of this type which are so formed as to be held in the body portion of the feed chuck so as to exert a high degree of pressure on the stock to be fed. It is also an object of this invention to provide a feed chuck of this type in which recesses are provided in the body member at one or both ends of each slot to cooperate with an end of the springs to hold them in place on the body portion. A further object is to provide a feed chuck of this type with means for facilitating the insertion of the springs into their operative positions.

Other objects and advantages will be apparent from the following description of one embodiment of the invention and the novel features will be particularly pointed out hereinafter in connection with the appended claims.

In the accompanying drawings:

Fig. 1 is a side view of a feed chuck or finger embodying this invention and showing the same holding stock in the form of a rod.

Fig. 2 is a fragmentary longitudinal section view thereof, on line 2—2, Fig. 1.

Figs. 3 and 4 are transverse sectional elevations thereof respectively on lines 3—3 and 4—4 of Fig. 2.

Fig. 5 is a view similar to Fig. 2, but showing the sleeve used in applying an end of a spring to the body portion.

Fig. 6 is a similar fragmentary view showing the spring and the positioning sleeve in different positions.

Fig. 7 shows the spring moved into its operative position after initial positioning of the same by the sleeve.

In the particular embodiment of this invention shown by way of example in the drawings, 8 represents the tubular body portion or member of a feed chuck. This body member is provided at the receiving end thereof with a threaded part 9 which is formed for engagement with the usual feed tube (not shown) which advances the body member in the direction of its axis whenever stock is to be fed. 10 represents a piece of stock with which my improved feed chuck may cooperate, this stock being in the form of a round bar, but it will be understood that my improvements may be used in connection with stock of other cross sectional shapes.

The body member 8 of the feed chuck is provided at intervals about the periphery of the same with slots or cut-out portions 11 arranged intermediate of the ends of the body member. Any desired number of these slots may be provided, three being shown in the construction illustrated by way of example.

The stock to be fed by the feed chuck is engaged by means of springs 12 removably mounted on the body member and arranged partly in the slots 11. These springs extend from the slots into the interior of the body member 8 into position to engage the stock. The springs are preferably in the form of leaf springs made of a strip of spring metal of a width slightly less than the width of the slots 11. The springs 12 are bowed so that the middle portions thereof will extend into the interior of the body member 8 into position to engage the stock. The springs have middle portions 13 which are flat in cross section, particularly when operating on stock of polygonal cross section. At opposite sides of the middle portion 13, each spring is provided with inclined portions 14 which terminate at their ends in substantially flat end portions 15 arranged within the slots 11 of the body member.

The ends 15 of the springs may be secured to the body member in any suitable or desired manner, and in the construction shown by way of example, the body member is provided at the ends of the slots 11 with recesses 17. These recesses may be of any suitable or desired shape, those shown being approximately of semi-circular form and the ends 15 of the springs are also semi-circular at their ends so as to fit into the recesses 17. In the particular construction shown, both ends of the slots 11 are provided with recesses, but it will be obvious that one or other end of the spring may be supported on the body portion by other means.

In Figs. 2 and 7, a spring is shown in operative relation to a tubular body member, the spring shown in Fig. 2 extending to a materially lesser extent into the interior of the body member than the spring shown in Fig. 7, so that the springs shown in Fig. 2 may cooperate with work or stock of larger diameter than the spring shown in Fig. 7. It will be obvious that these springs may be made of different shapes to cooperate with stock of many different diameters or cross sectional shapes.

When the body member of the feed chuck is provided with recesses 17 at opposite ends of the slots 11, the springs may be positioned in their operative relations to the body member by first inserting one end of the spring into its recess manually. The spring may then be bent or flexed to insert the other end thereof into its recess. It is desirable to provide some means for easily forcing the other end of the spring into its recess 17. Any desired means may be provided for this purpose, and in the construction shown, I have provided a spring inserting sleeve 20, Figs. 5 and 6 which is of such internal diameter as to fit slidably over the body member of the feed chuck. This spring positioning member is provided with an inwardly extending inclined or bevelled face 21 formed to engage the other end of a spring when the positioning member 20 is initially placed over the end of the feed chuck as shown in Fig. 5. This positioning member is, consequently, forced to move lengthwise along the body portion, whereupon the spring will be deformed to a slight extent and until this end of the spring is forced by the inclined face 21 of the positioning member inwardly to seat against the adjacent end of the slot 11 as shown in Fig. 6. When the spring is in this position, the end thereof may easily be forced inwardly with reference to the adjacent end of the slot until this end of the spring snaps into the recess 17. This final moving of the end of the spring may be effected by striking this end of the spring with a hammer or other suitable implement or by applying pressure against it.

The operation of the feed chuck will be readily understood by reference to Figs. 2 and 7, in which the middle portions of the springs are shown in engagement with the stock 10. The springs are initially so proportioned that they extend inwardly into the body member to a slightly greater extent when not engaged by the stock. Consequently, when the stock is moved between the springs, the ends of the springs will be forced into engagement with the inner ends of the recesses 17 and this will result in a deflection or bending of the inclined parts 14 of the springs, and since these parts are relatively short and are bent or deflected mainly by pressure exerted lengthwise thereof, it will be obvious that these inclined parts 14 will press the middle portions 13 of the springs against the stock with heavy pressure, particularly since the recesses 17 are so shaped as to engage parts of the side edges of the ends of the springs so that these ends 15 will be relatively inflexible, thus concentrating the flexing mainly on the inclined parts 14. These middle portions 13 are slightly bowed or curved in the direction of their length when initially applied to the body member of the feed chuck, but when pressed against the stock by means of the inclined end portions 14, the middle portions will flatten out approximately as shown in Figs. 2 and 7.

The inclined parts 14 of the springs also serve to guide the stock into operative position between the springs when initially inserted into the feed chuck.

When a spring becomes worn and it is desired to replace the same with a new spring, it is only necessary to press the spring 12 inwardly into the interior of the body member of the feed chuck whereupon one or both ends of the spring will move out of its recesses and out of the slot 11 into the interior of the body member 8, so that the same may be easily removed. A spring may also be removed from its operative position in the body member by means of an impact which may be applied to the spring by means of a punch or pin of smaller diameter than the width of the slot 11. Another spring may then be inserted by any suitable means, such for example as the positioning sleeve 20, as described. It is, consequently, a relatively easy matter to remove the springs from a feed chuck and replace them with springs of different shape in order to cooperate with work of a different diameter.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. A feed chuck for feeding bar stock in a machine in which the stock is rotated, said chuck including a tubular body member having a plurality of longitudinally extending slots arranged at intervals about the periphery thereof intermediate of the ends of said body member, a leaf spring arranged in each of said slots and having a portion thereof extending inwardly into said body member into position to engage stock to be fed in said body member, and means on said tubular body member cooperating with said springs for holding said springs in their operative positions in said slots.

2. A feed chuck for feeding bar stock in a machine in which the stock is rotated, said chuck including a tubular body member having a plurality of longitudinally extending slots arranged at intervals about the periphery thereof intermediate of the ends of said body member, a spring made of a strip of metal arranged in each of said slots and having an intermediate portion extending inwardly into said body member into position to engage stock to be fed in said body member, and means on said tubular body member cooperating with the ends of said springs for holding said springs in their operative positions in said slots.

3. A feed chuck for feeding bar stock in a machine in which the stock is rotated, said chuck including a tubular body member having a plurality of longitudinally extending slots arranged at intervals about the periphery thereof intermediate of the ends of said body member, a spring made of a strip of metal arranged in each of said slots and having an intermediate portion extending substantially parallel to the stock to be fed for engagement therewith and terminating in diverging parts, extending from the ends of said intermediate portion toward said body member, said outwardly extending parts terminating in ends, and means on said body member for holding the ends of said parts in fixed relation thereto.

4. A feed chuck according to claim 3, in which said diverging parts terminate in ends extending substantially parallel to said body member and entering into said slots, and means on said body member for holding said ends in said body member.

5. A spring for use on a tubular body member of a feed chuck, said spring having an intermediate portion formed to engage stock to be fed, said intermediate portion terminating in diverging inclined parts which guide the stock into operative relation to said intermediate portion, said diverging parts terminating in ends which extend approximately parallel to said intermediate portion, said intermediate portion being bowed in the direction of its length toward the axis of the chuck to be straightened by the stock engaging the same, thereby increasing the pressure exerted by the spring on the stock and the surface of contact of the said springs with the work.

6. A feed device for feeding bar stock in a machine in which the stock is rotated, said device including a tubular body member having a plurality of longitudinally extending slots arranged at intervals about the periphery thereof intermediate of the ends of said body member, a spring for each of said slots of a length greater than the length of the slot with which it cooperates and having an intermediate portion extending into the interior of said body member to cooperate with stock in said body member, said body member having recesses at the ends of said slots into which the ends of said springs may enter, and a removable sleeve extending about said body member and slidable thereon and having an inclined shoulder formed to engage one end of a spring when the other end of the same has been inserted into a recess at one end of a slot for flexing said spring to force the other end thereof into engagement with the other end of said slot.

7. A feed chuck for feeding bar stock in a machine in which the stock is rotated, said chuck including a tubular body member and a plurality of leaf springs arranged at intervals about the periphery of said body member and having their ends removably secured to said body member and their intermediate portions extending inwardly with reference to said body member into positions for direct contact with said stock.

References Cited in the file of this patent

UNITED STATES PATENTS

| | | |
|---|---|---|
| 2,325,691 | Litwin et al. | Aug. 3, 1943 |
| 2,651,108 | Weems | Sept. 8, 1953 |
| 2,735,704 | Lofqvist | Feb. 21, 1956 |

FOREIGN PATENTS

| | | |
|---|---|---|
| 257,048 | Great Britain | Aug. 26, 1926 |